F. D. SIEMAN.
ADJUSTABLE VEHICLE BOX.
APPLICATION FILED MAY 26, 1909.
987,328.
Patented Mar. 21, 1911.
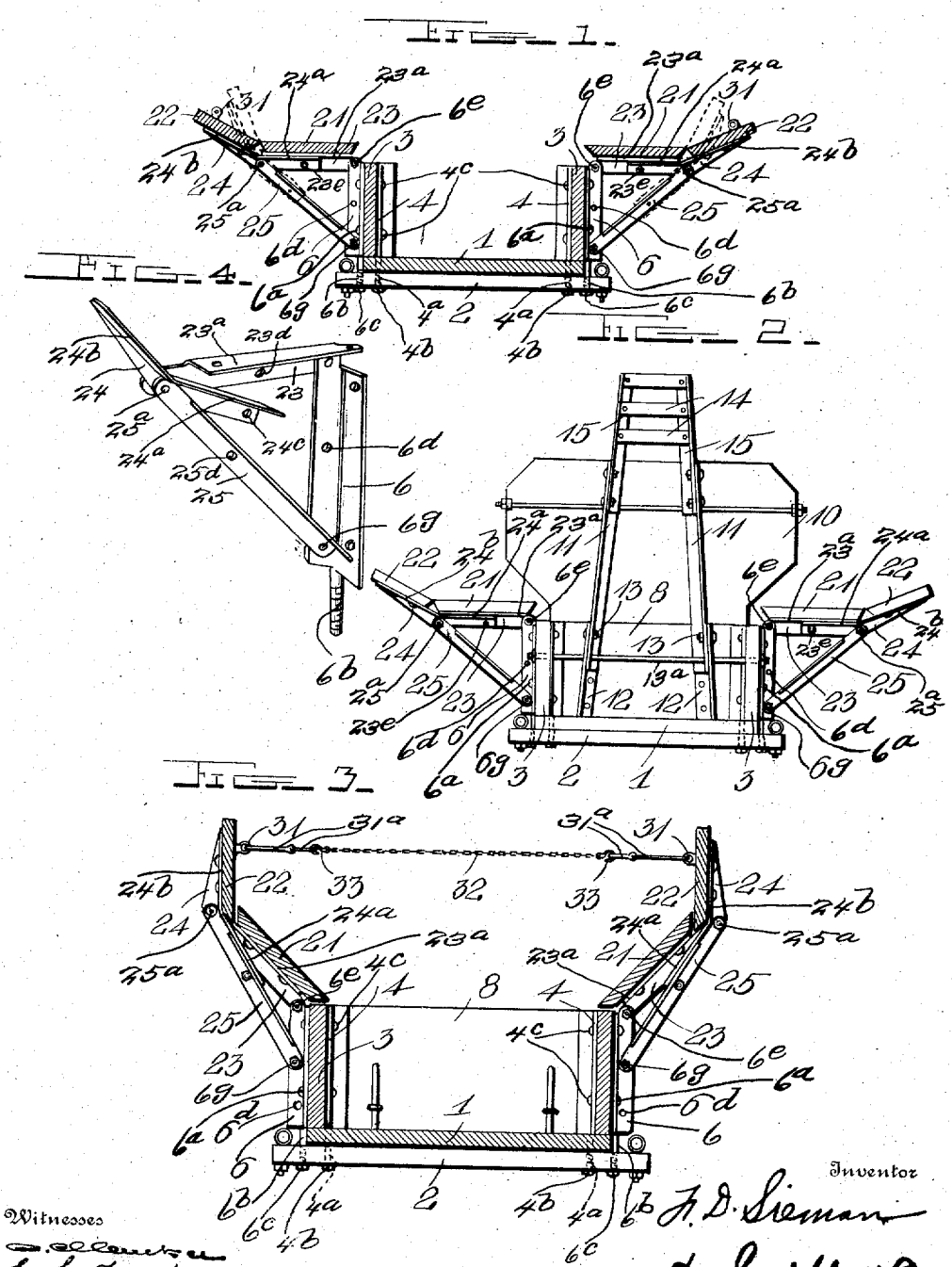

UNITED STATES PATENT OFFICE.

FREDERICK D. SIEMAN, OF MENOMINEE, MICHIGAN.

ADJUSTABLE VEHICLE-BOX.

987,328.  Specification of Letters Patent.  Patented Mar. 21, 1911.

Application filed May 26, 1909. Serial No. 498,564.

*To all whom it may concern:*

Be it known that I, FREDERICK D. SIEMAN, a citizen of the United States, residing at Menominee, in the county of Menominee and State of Michigan, have invented a new and useful Adjustable Vehicle-Box; and I do hereby declare the following to be a full, clear, and exact description of the invention, such as will enable others skilled in the art to which it appertains to make and use the same.

This invention belongs to the art of vehicles or wagons, and it particularly pertains to a new and useful vehicle box, of a new and novel structure, which may be converted into various shapes, for instance, it may be converted into a bus, for the conveyance of people, or into a desired shape, whereby various crops may be conveyed.

The primary object of the invention is the construction of the vehicle box having adjustable members or braces, whereby the side boards may be held in various positions, suitable to support passengers or various crops thereon.

The drawings only disclose one form of the invention, but in practical fields this form may necessitate changes and alterations, to which the applicant is entitled, provided such changes and alterations are comprehended by the appended claim.

Referring to the drawings:—Figure 1 represents a transverse sectional view of a vehicle box, showing the extensible side boards disposed in one position, and further showing the extreme extensible side boards arranged in positions whereby the box may be used as a bus, as shown in dotted lines. Fig. 2 is a front end view of the vehicle box. Fig. 3 is a transverse sectional view through the vehicle box, showing the same arranged for hauling beets or similar crop. Fig. 4 is a perspective view of the adjustable members or braces.

As to the annexed drawings, 1 denotes the bed of the vehicle box which is secured to transverse bars 2. The outer ends of these bars project outwardly of the sides of the box. Rising from each side of the bed are the side boards 3, which are held in place by the vertical bars 4. The lower ends of the vertical bars 4 are provided with extensions $4^a$, which are threaded, and designed to penetrate the bed. To the threaded ends of these extensions, nuts $4^b$ are applied, in order to hold the bars 4 vertically in position. The bars 4 are secured to the side boards, by any suitable means, preferably bolts $4^c$.

Secured to the outer faces of the side boards by means of bolts $6^a$, are the standards or members 6. The lower ends of these standards or members 6 are formed with extensions $6^b$. These extensions are threaded, as shown clearly in Fig. 4, and are designed to penetrate through the sills 2 of the vehicle, and to them nuts $6^c$ are threaded, whereby the standards may be held perpendicularly in position. The standards 6 are angular in cross section, and one of their flanges is provided with apertures $6^d$.

Pivoted to the upper ends of the standards 6, as at $6^e$, are the braces 23, which are formed with flanges $23^a$, to which the extensible side boards 21 are fixed. When the members or braces 23 are in the positions shown by dotted lines in Fig. 1, the extensible side boards 21 may be utilized, as seats.

25 represents angularly disposed braces or members, the lower ends of which are fastened to the flanges of the standards 6, by means of the apertures $6^d$, and the bolts $6^g$. The lower ends of the angularly disposed braces or members 25 may be adjusted, to coöperate with either one of the apertures $6^d$, as will be clearly understood from Figs. 1, 2 and 3. The upper ends of the angularly disposed braces or members 25, and the outer ends of the members or braces 23 are fastened together by means of the bolts or rivets $25^a$, and between these ends the angular members 24 are pivoted, in order to slightly oscillate, whereby they may be arranged in various positions. These angular members 24 are provided with flanges $24^a$ and $24^b$. The flanges $24^a$ are designed to limit the movement of the angular members 24 in one direction, by contacting with the flanges $23^a$ of the members 23, while they are limited in another direction by contacting with the angularly disposed braces 25.

When the angular members 24 are adjusted in position, as shown in full lines in Figs. 1 and 2, the extensible side boards 22 (which are secured to the flanges $24^b$) are held near a horizontal position. But, however, when the angular members 24 are adjusted in position, as shown in dotted lines in Fig. 1, the extensible side boards 22 are held near vertical positions. When the extensible side boards 22 are held approximately in vertical positions, the flanges $24^a$ contact with the angularly disposed braces or members 25. When the angular members 24 are arranged in either of these positions, the apertures 24$^c$ are brought into registration with either of the apertures 23$^d$ and 25$^d$, and held in registration by means of the bolts 23$^e$, as shown clearly in Fig. 1.

Referring to Fig. 3, it will be seen that the lower ends of the angularly arranged members 25 have been adjusted, and held so, in coöperation with the uppermost apertures 6$^d$, and in so adjusting these members, the braces or members 23 are arranged angularly, while the end portions of the angular members 24, which are provided with the flanges 24$^b$, and the adjustable side boards 22, are arranged approximately in vertical positions.

The extensible side boards 22 are provided with eyes 31, in which the links 31$^a$ are supported. A chain 32 having a hook at each end may engage the links, in order that the side boards 22 may be held more securely in the positions shown in Fig. 3.

Secured to the front gate member are angle bars 12, to which are secured the bars 11, by means of the bolts 13 and the locking bar 13$^a$. Bolted to the upper ends of the angle bars 11 are the angle members 15, to which the transverse members 14 are secured. The angle members 15 and the members 14 constitute an extension ladder, which prevents the hay or other material on the bed of the wagon from falling on the driver. Secured to the angle bars 11 is an extension 10 of the front end gate, which extension 10 also prevents the hay and the like from falling on the driver.

When the extensible side boards 21 and 22 are adjusted in the positions shown in Fig. 2, beets or similar crops may be conveyed.

The invention having been set forth, what is claimed as new and useful is:—

In combination, a vehicle body having side boards, angle iron standards secured to the side boards, angle iron supports pivoted to the upper ends of the standards and designed to be arranged at various angles, angle iron braces having their upper outer ends connected to the outer ends of the supports, while their lower ends are adjustably connected to the standards, so that the supports may be arranged at different angles, angle iron members comprising two parts extending at angles to one another, said angle iron members being pivoted substantially midway of their lengths between the connected ends of the braces and supports, one of the parts of the angle iron members having limited movements between the braces and supports, and adapted to be connected to one or the other so as to change the positions of the other parts of the angle iron members.

In testimony whereof I have signed my name to this specification in the presence of two subscribing witnesses.

FREDERICK D. SIEMAN.

Witnesses:
G. H. HAGGERSON,
ELSIE KRUEGER.

---

Copies of this patent may be obtained for five cents each, by addressing the "Commissioner of Patents, Washington, D. C."